United States Patent
Friesen et al.

(10) Patent No.: US 12,377,825 B2
(45) Date of Patent: Aug. 5, 2025

(54) METHOD AND DEVICE FOR MONITORING AND INFLUENCING THE THERMAL STATE OF A FRICTION BRAKE SYSTEM OF A RAIL VEHICLE

(71) Applicant: KNORR-BREMSE SYSTEME FUR SCHIENEN-FAHRZEUGE GMBH, Munich (DE)

(72) Inventors: Ulf Friesen, Neubiberg (DE); Ralf Furtwängler, Munich (DE); Fabian Hauss, Pfaffenhofen (DE); Werner Machane, Pfaffenhofen (DE); Gerhard Stahlbauer, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 101 days.

(21) Appl. No.: 18/279,774

(22) PCT Filed: Feb. 14, 2022

(86) PCT No.: PCT/EP2022/053546
§ 371 (c)(1),
(2) Date: Aug. 31, 2023

(87) PCT Pub. No.: WO2022/184410
PCT Pub. Date: Sep. 9, 2022

(65) Prior Publication Data
US 2024/0308483 A1    Sep. 19, 2024

(30) Foreign Application Priority Data
Mar. 1, 2021   (DE) ................. 10 2021 104 799.4

(51) Int. Cl.
*B60T 8/17* (2006.01)
*B60T 8/32* (2006.01)
*B60T 17/22* (2006.01)

(52) U.S. Cl.
CPC .......... *B60T 8/1705* (2013.01); *B60T 8/3235* (2013.01); *B60T 17/228* (2013.01)

(58) Field of Classification Search
CPC .... B60T 8/1705; B60T 8/3235; B60T 17/228; B60T 8/1893; B60T 8/3245; B60T 17/20
See application file for complete search history.

(56) References Cited

U.S. PATENT DOCUMENTS 8,942,903 B2 *  1/2015  Friesen ............... F16C 19/525
                                                            701/29.2
9,187,103 B2 * 11/2015  Furtwängler ........ F16C 19/525
(Continued)

FOREIGN PATENT DOCUMENTS

| AT | 519312 A1 | 5/2018 |
|----|-----------|--------|
| WO | 92000212 A1 | 1/1992 |
| WO | 2009074265 A1 | 6/2009 |

OTHER PUBLICATIONS

International Search Report corresponding to PCT/EP2022/053546 dated Jun. 15, 2022.

*Primary Examiner* — Sizo B Vilakazi
(74) *Attorney, Agent, or Firm* — Barnes & Thornburg LLP

(57) ABSTRACT

A method and device monitor and influence the thermal state of a friction brake system of a rail vehicle on the basis of a calculated or estimated predictive friction element temperature of at least one friction element of the friction brake system. The method detects at least one parameter which characterizes the current driving operation situation of the rail vehicle; calculates, estimates, or determines a first temperature component of the predictive friction element (Continued)

temperature based on the current driving operation situation of the rail vehicle; and takes into consideration a first temperature component while monitoring and influencing the thermal state of the friction brake system.

21 Claims, 4 Drawing Sheets

(56) References Cited

U.S. PATENT DOCUMENTS

| | | | | |
|---|---|---|---|---|
| 2012/0193484 | A1* | 8/2012 | Furtwangler | B61K 9/04 |
| | | | | 246/169 A |
| 2012/0197505 | A1* | 8/2012 | Friesen | F16C 19/525 |
| | | | | 701/1 |
| 2014/0046514 | A1* | 2/2014 | Jennek | B60T 17/228 |
| | | | | 701/20 |
| 2018/0118228 | A1* | 5/2018 | Worden | B60T 17/228 |
| 2020/0017094 | A1* | 1/2020 | Gutschi | B60T 17/228 |
| 2024/0010175 | A1* | 1/2024 | Matsuyama | B60T 8/172 |
| 2024/0132028 | A1* | 4/2024 | Friesen | B60T 17/228 |

\* cited by examiner

METHOD AND DEVICE FOR MONITORING AND INFLUENCING THE THERMAL STATE OF A FRICTION BRAKE SYSTEM OF A RAIL VEHICLE

CROSS REFERENCE AND PRIORITY CLAIM

This patent application is a U.S. National Phase of International Patent Application No. PCT/EP2022/053546 filed Feb. 14, 2022, which claims priority to German Patent Application No. 10 2021 104 799.4, the disclosure of which being incorporated herein by reference in their entireties.

FIELD

The disclosed embodiments relate to a method and a device for monitoring and influencing the thermal state of a friction braking system of a rail vehicle and a rail vehicle with such a device.

BACKGROUND

Rail vehicles often have an electrodynamic braking system and additionally a friction braking system, which interact in accordance with certain criteria (blending), with priority being given to using the electrodynamic brakes in order to reduce the wear of the friction braking system. Some rail vehicles have a friction braking system, but no electrodynamic brakes.

Therefore, in the event of a complete or partial absence of electrodynamic brakes, it may be that braking, in particular service braking, must be mainly or exclusively carried out with the friction braking system. The greater the weight of the vehicle that is being braked by the friction braking system, and the higher the braking commencement speed of the rail vehicle, i.e. the higher the speed at which the friction braking is begun, the greater the energy input and consequently the greater the increase in the temperature of the brake disks and brake linings. As a consequence, there is an increase in the fluctuation of the friction coefficient $\mu$ of the brake disk/brake lining pairing, and with it the probability of a reduction in the friction coefficient $\mu$. At high braking commencement speeds, there is therefore the risk of the braking distances becoming longer on account of brake fading.

SUMMARY

Disclosed embodiments provide a method and a device which on the one hand offer greater safety from overheating of the friction braking system, but on the other hand allow a highest possible speed of the rail vehicle, that is to say running "at the limit". Similarly, a rail vehicle with such a device is to be provided.

BRIEF DESCRIPTION OF THE FIGURES

Exemplary embodiments are represented below in the drawing and are explained more specifically in the following description. In the drawing.

DETAILED DESCRIPTION

Figure 1:
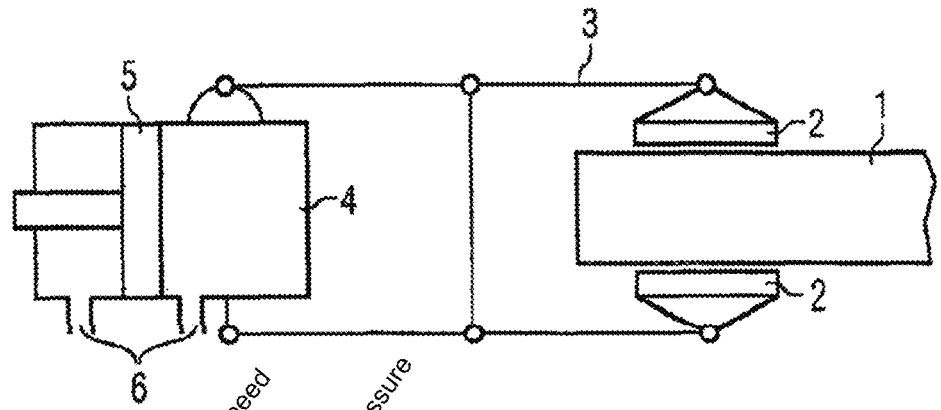
FIG. 1 shows a schematic representation of an embodiment of a pneumatic friction braking device given by way of example, with a brake disk and a brake caliper with brake linings.

Brake fading is understood here as meaning the lessening of the braking effect of a friction braking system due to influences such as becoming heated or wet. In order to avoid brake fading because of becoming heated, the maximum speed of the rail vehicle is limited situation-dependently by a maximum permissible speed.

In this respect, WO 2018/054736 A1, concerning the matter in question, proposes a method and a device for influencing kinematic behavior of a vehicle with at least one friction braking system in which a braking effect is produced by pressing at least a first friction element and a second friction element against one another, wherein at least information about a speed, a braking pressure and an outside temperature of the vehicle as well as about absolute times is used to calculate at least temperatures of at least the first friction element, and wherein this calculation takes into consideration thermal conduction through the at least first friction element and speed-dependent cooling of the at least first friction element, and wherein influencing of the kinematic behavior of the vehicle takes place based on this calculation.

The background for the disclosed embodiments is that, during operation or running of the rail vehicle, it should be ensured at all times that a defined type of braking with a defined braking effect, such as for example emergency braking, automatic train stopping or rapid braking, can be carried out without the friction element temperature (for example brake disk temperature) entering a critical range due to the temperature swing dT produced as a result. For this reason, in the calculation or estimate of the first temperature component Tcurrent of the predictive friction element temperature Tpred that is carried out, in particular continually, optionally while running, the temperature swing dT caused by a defined type of braking, such as for example emergency braking, automatic train stopping or rapid braking, is also constantly, continually or intermittently calculated, determined or estimated additionally as the second temperature component of the predictive friction element temperature Tpred and then taken into consideration when monitoring and influencing the thermal state of the friction braking system. Dependent on the predictive friction element temperature Tpred, that is to say the sum of the first temperature component Tcurrent and the second temperature component dT, calculated or estimated based on a theoretical or notional performance of the defined type of braking, the thermal state of the friction braking system of the rail vehicle is then monitored and influenced.

The influencing of the thermal state may in this case take place directly, specifically by an influencing signal, or else indirectly, for example by a driver or train conductor of the rail vehicle in response to a corresponding indicating signal or warning signal, in that for example, in the event of an impending (potential) overheating of the friction braking system, the speed and/or the deceleration of the rail vehicle is (are) reduced in order to lower the possible thermal loading of the friction braking system. The influencing of the thermal state of the friction braking system therefore optionally takes place by an adaptation or alteration of the speed and/or the deceleration of the rail vehicle.

Disclosed embodiments are based on a method for monitoring and influencing the thermal state of a friction braking system of a rail vehicle dependent on a calculated or estimated predictive friction element temperature Tpred of at least one friction element of the friction braking system, comprising at least the following:

a) detecting at least one parameter which characterizes a current operating situation of the rail vehicle, b) calculating, estimating or determining a first temperature component Tcurrent of the predictive friction element temperature Tpred based on the current operating situation of the rail vehicle and taking the first temperature component Tcurrent into consideration when monitoring and influencing the thermal state of the friction braking system.

Optionally, the parameter and/or the characteristic variable for characterizing the current operating situation is not a temperature variable, i.e. the first temperature component is optionally not measured by a temperature sensor. For example, the first temperature component Tcurrent of the predictive friction element temperature Tpred is estimated or calculated from the at least one parameter by a model.

Alternatively, at least one temperature sensor may also be used for the (direct) detection of the first temperature component.

A rail vehicle should be understood here as meaning any type of track-bound vehicle with a drive machine, in particular traction vehicles, or else without a drive machine, such as cars in combinations of rail vehicles and also a combination of rail vehicles comprising multiple rail vehicles.

According to the disclosed embodiments, it is provided that c) the monitoring and influencing of the thermal state of the friction braking system additionally takes into consideration a second temperature component dT of the predictive friction element temperature Tpred, which would be obtained in addition to the first temperature component Tcurrent at the at least one friction element on the assumption that, in the current operating situation of the rail vehicle, (additionally) braking with a defined type of braking is notionally or theoretically carried out, and that d) the predictive friction element temperature Tpred of the at least one friction element is determined as the sum of the first temperature component Tcurrent and the second temperature component dT, and that e) if the predictive friction element temperature Tpred is greater than the allowed friction element maximum temperature Tmax of the at least one friction element, a first signal is generated, representing a potentially thermally critical state of the at least one friction element, and otherwise a first signal is not generated.

Generation of the first signal therefore indicates a potentially critical thermal state of the at least one friction element. Potentially critical because the prerequisite is the assumption that, in the current operating situation, braking with the defined type of braking is only notionally or theoretically carried out. Therefore, the "thermal loading potential" of the at least one friction element of the friction braking system is potentially exhausted in generating the first signal.

In the other case, i.e. if the predictive friction element temperature Tpred is less than or equal to the allowed friction element maximum temperature Tmax of the at least one friction element, a first signal is not generated or generation of the first signal is suppressed, because it has been found then that the at least one friction element is not in a potentially critical thermal state.

Generation of the first signal may also be synonymous with suppressing a signal which in particular, as a preset signal, indicates an uncritical thermal state of the at least one friction element.

The method is therefore intended to achieve that, at each point in time during running of the rail vehicle, a defined type of braking, such as for example emergency braking, can be carried out without the predictive friction element temperature Tpred of the at least one friction element exceeding the allowed friction element maximum temperature Tmax as a result. The additional temperature swing occurring in the notional braking by the defined type of braking in the form of the second temperature component dT is therefore taken into consideration when monitoring and influencing the thermal state of the friction braking system. In other words, already before the defined type of braking is actually performed, an estimate or calculation of the second temperature component dT is optionally carried out at each point in time and/or continuously during running in order to predict the predictive friction element temperature Tpred (predictive approach) under the prerequisite that the defined type of braking is performed. However, in this case it is not absolutely necessary that the defined type of braking is then also actually carried out in parallel with the current operating situation. The estimate or the calculation of the second temperature component dT is only carried out for safety reasons in order to avoid temperature overloading of the at least one friction element of the friction braking system at any point in time during running, without it being absolutely necessary in this case that the defined type of braking is actually performed. The initial situation is therefore the current operating situation in which the rail vehicle is running with a specific speed and loading and under specific ambient and track conditions along a section of track which is for example level or has a specific gradient or a specific incline. For example, the speed, the loading, the gradient or the incline are then detected as parameters. Also, the current operating situation may include that for example service braking deviating from the defined type of braking has already been triggered, in which case for example the current braking pressure and/or the current braking force and/or the current braking torque is (are) then detected as parameters. Alternatively, there may be no braking in the current operating situation, and then the parameters concerning the current braking pressure and/or the current braking force and/or the current braking torque are equal to zero. Also alternatively, braking with a defined type of braking may also already take place or have taken place in the current operating situation.

Based on this current actual operating situation or the parameters directly or indirectly detected thereby, the first temperature component Tcurrent of the predictive friction element temperature Tpred is then calculated or estimated by a model based on the current operating situation of the rail vehicle or alternatively or additionally detected by at least one temperature sensor. This first temperature component Tcurrent then corresponds to the temperature which is actually obtained based on the current operating situation at the at least one friction element.

Additionally taken into consideration is the second temperature component dT of the predictive friction element temperature Tpred, which is calculated or estimated by means of the model and which would be obtained in addition to the first temperature component Tcurrent at the at least one friction element of the friction braking system if, in the current operating situation of the rail vehicle, braking were notionally carried out with a defined type of braking which is not requested, or has not yet been requested, in the current operating situation but could be requested in the current operating situation. The first temperature component Tcurrent is optionally continually calculated, even if momentarily a specific type of braking is being carried out. dT as the second temperature component is the additional temperature swing, which is for example speed- and/or deceleration-dependent. If therefore emergency braking is actually initiated, the first temperature component Tcurrent increases, on the other hand the second temperature component dT, and consequently the maximum speed, decreases.

Then, the predictive friction element temperature Tpred of the at least one friction element of the friction braking system is determined as the sum of the first temperature component Tcurrent and the second temperature component dT. This predictive friction element temperature Tpred would therefore theoretically or notionally be obtained, estimated or calculated, at or in the at least one friction element when the defined type of braking is performed in the current operating situation.

Since a rail vehicle usually has multiple friction brakes—for example in the form of disk brakes and/or shoe brakes—the friction brake under the greatest thermal loading, as the (thermally) weakest link, may be for example the measure for the determination of the optimum or maximum permissible speed of the rail vehicle. Each of the friction element pairs contained within the structure of a train will optionally locally ascertain its own Tpred. Therefore, n locally ascertained Tpred temperatures are obtained. In this case, at the higher levels of the train there should be a prescribed algorithm which draws the correct conclusions from these n values in the sense of a consolidation and conveys the correct instructions to the driver or an automatic train running system.

Thus, for example, the mean value could be formed from all of the locally ascertained Tpred values and, if the mean value is <Tmax, the train may run faster. According to an alternative algorithm, in the sense of a maximum value consideration, upward and downward "outliers" may also be removed from the further calculation in the course of the consolidation.

As already indicated above, the defined type of braking comprises at least one of the following types of braking: emergency braking, automatic train stopping, rapid braking, hazard braking.

According to DIN EN 14478:2005-06, these types of braking are defined as follows:

Rapid braking: Applying a predefined braking force while using all operational brakes, which ensures the required braking ability and the required safety level. The braking ability described in vehicle-specific European standards (EN) and the safety level of the rapid braking are usually equal to or greater than the corresponding values of maximum service braking (full braking) under the prerequisite that the required adhesion and other necessary prerequisites are satisfied. The term used may change, dependent on the respective type of train or transportation system and the type of activation of the rapid braking, as explained below:

Rapid braking: Rapid braking triggered by the driver of the traction vehicle;

Hazard braking: Rapid braking in local transport braking systems;

Automatic train stopping: Rapid braking automatically activated by a signal or protective systems (for example train influencing systems);

Emergency braking: Rapid braking triggered by passengers or train personnel by actuating an emergency brake handle. The emergency brake handle is the actuating interface of a passenger alarm system;

Full braking: Greatest achievable level of service braking;

Safety braking: Specifically for local transport braking systems, braking with a higher safety level than in the case of service and hazard braking modes. The braking ability may be less than in the case of maximum service braking or in the case of hazard braking;

Service braking: Applying an adjustable braking force for regulating the speed of a train, including reducing the speed, stopping and temporarily at a standstill, and is the type of braking used most frequently.

As already stated above, the parameter or the parameters that characterize(s) the current operating situation may be at least one of the following parameters: the current speed of the rail vehicle, the current braking force, the current braking torque, the current braking pressure, the ambient temperature of the rail vehicle, the current load and/or loading of the rail vehicle, an incline or a gradient of the section of track being run over by the rail vehicle, service braking or normal application of the brakes, with a braking effect which is less than the braking effect in the case of the defined type of braking. This list is not exhaustive. Also conceivable are further parameters that can characterize a current operating situation of a rail vehicle, such as for example also a coefficient of friction between the wheels and the rails.

Optionally, at least one friction element of the friction braking system may comprise a brake disk and/or a brake lining of a disk brake of the friction braking system. Alternatively, other friction brakes are also possible, such as for example shoe brakes.

Particularly optionally, if it is found that the predictive friction element temperature Tpred is greater than the allowed friction element maximum temperature Tmax of the at least one friction element, the first signal may represent a warning signal, which is optically and/or acoustically output by way of an output unit and which represents or comprises an indication of the potentially thermally critical state of the at least one friction element, and/or represent a first influencing signal, which is output to at least one controller of the rail vehicle, which controls the traction and/or the brake of the rail vehicle in an open-loop or closed-loop manner, and by which the running speed v of the rail vehicle and/or the deceleration a of the rail vehicle is reduced until the predictive friction element temperature Tpred is less than or equal to the allowed friction element maximum temperature Tmax of the at least one friction element.

The warning signal may be output for example to a train conductor, in order for the latter to reduce the speed and/or the deceleration. Alternatively or additionally, the speed and/or the deceleration of the rail vehicle may be automatically reduced based on the first influencing signal, for example by a control unit.

In the other case, if it is found that the predictive friction element temperature Tpred is less than the allowed friction element maximum temperature Tmax of the at least one friction element, a second signal may be generated, representing a thermally uncritical state of the at least one friction element.

The second signal may then in particular represent an indicating signal, which is optically and/or acoustically output by way of an output unit and which comprises an indication to the effect that a current speed of the rail vehicle can be maintained or increased, and/or represent a second influencing signal, which is output to at least one controller of the rail vehicle, which controls the traction and/or the brake of the rail vehicle in an open-loop or closed-loop manner, and by which the running speed v of the rail vehicle and/or the deceleration a of the rail vehicle is increased until the predictive friction element temperature Tpred is equal to the allowed friction element maximum temperature Tmax of the at least one friction element. In order to increase the current speed automatically, usually further factors also have to be taken into consideration. For example, dependent on the section of track, speed limits could exist or the train is entering the station or, when running downhill, the speed per se must not be increased.

The indicating signal may be output for example to a train conductor, in order for the latter to maintain or optionally increase the speed and/or the deceleration, as long as this is possible based on the operational boundary conditions, for example track-dependent speed limitations. Alternatively or additionally, the speed and/or the deceleration of the rail vehicle may also be automatically maintained or optionally increased based on the first influencing signal.

In this case, the "thermal loading potential" of the at least one friction element of the friction braking system has therefore not yet been fully exhausted, and so the speed and/or the deceleration of the rail vehicle can be increased for thermal reasons alone. From this aspect, a speed and/or a deceleration at which the predictive friction element temperature Tpred corresponds to the allowed friction element maximum temperature Tmax of the at least one friction element is ideal.

A further thermally critical state of the at least one friction element exists if the first temperature component Tcurrent of the predictive friction element temperature Tpred alone, i.e. without the second temperature component dT being included, is already greater than the allowed friction element maximum temperature Tmax of the at least one friction element. Then, a third signal is optionally generated.

The third signal may represent a warning signal, which is optically and/or acoustically output by way of an output unit and which represents or comprises an indication of a thermally critical state of the at least one friction element, and/or represent a third influencing signal, which is output to at least one controller of the rail vehicle, which controls the traction and/or the brake of the rail vehicle in an open-loop or closed-loop manner, and by which the running speed v of the rail vehicle and/or the deceleration a of the rail vehicle is reduced until the first temperature component Tcurrent is less than or equal to the allowed friction element maximum temperature Tmax of the at least one friction element.

In this case, the warning signal may in turn be output for example to a train conductor, in order for the latter to reduce the speed and/or the deceleration. Alternatively or additionally, the speed and/or the deceleration of the rail vehicle may be automatically reduced based on the third influencing signal, for example by a control unit.

Various disclosed embodiments are based on a device for monitoring and influencing the thermal state of a friction braking system of a rail vehicle dependent on a predictive friction element temperature Tpred of at least one friction element of the friction braking system at least partially calculated or estimated by a model, the device comprising at least the following:

a) detectors, which are designed for detecting at least one parameter which characterizes a current operating situation of the rail vehicle, b) a computing unit, which is designed for monitoring and influencing the thermal state of the friction braking system and in which the model is implemented, wherein c) the detectors enter the at least one parameter into the computing unit, and wherein d1) the model carries out calculations in such a way that it calculates or estimates a first temperature component Tcurrent of the predictive friction element temperature Tpred based on the at least one parameter, and/or wherein d2) the detector is designed so as to detect the first temperature component Tcurrent of the predictive friction element temperature (Tpred) and enter it into the model, and wherein e) the computing unit or the model is designed so as to take the first temperature component Tcurrent into consideration when monitoring and influencing the thermal state of the friction braking system.

A model is to be understood as meaning any physical-mathematical model that can be implemented by a storable program in a computing unit and with the aid of which the variables mentioned can be calculated based on the parameters.

According to various disclosed embodiments f) the model also carries out calculations in such a way that the monitoring and influencing of the thermal state of the friction braking system additionally takes into consideration a second temperature component dT of the predictive friction element temperature Tpred, which the model calculates or estimates and which would be obtained in addition to the first temperature component Tcurrent at the at least one friction element on the assumption that, in the current operating situation of the rail vehicle, braking with a defined type of braking is notionally or theoretically carried out, and wherein g) the model also carries out calculations in such a way that the predictive friction element temperature Tpred of the at least one friction element is determined as the sum of the first temperature component Tcurrent and the second temperature component dT, and that h) the computing unit is designed so as to generate based on the calculations of the model a first signal, representing a potentially thermally critical state of the at least one friction element, if it is established by the model that the predictive friction element temperature Tpred is greater than the allowed friction element maximum temperature Tmax of the at least one friction element, and otherwise a first signal is not generated.

The technical effects of the device according to the disclosed embodiments coincide with the technical effects described above of the method according to the disclosed embodiments.

The disclosed embodiments also relate to a rail vehicle with a device described above.

A detail schematically represented in FIG. 1 and taken from a friction braking device of a rail vehicle shows a pneumatic disk brake. This comprises a first friction element 1, which is embodied for example as a brake disk which is mounted on a wheelset axle (not represented) of the rail vehicle, and also a brake caliper. The brake caliper has a second friction element 2, which comprises two brake linings. Furthermore, the brake caliper has a brake cylinder 4 with compressed-air connections 6 and a piston 5 and also a linkage 3. The piston 5 actuates the linkage 3, whereby the brake linings arranged on the linkage 3, i.e. the second friction element 2, are pressed against the brake disk, i.e. the first friction element 1. Compressed air from a compressed-air system (not represented) of the rail vehicle is applied to the piston 5 for actuating the linkage 3 by way of the compressed-air connections 6. The compressed-air system has components for open-loop and closed-loop control of the friction braking device, such as for example compressors, brake control devices, etc.

Figure 2:
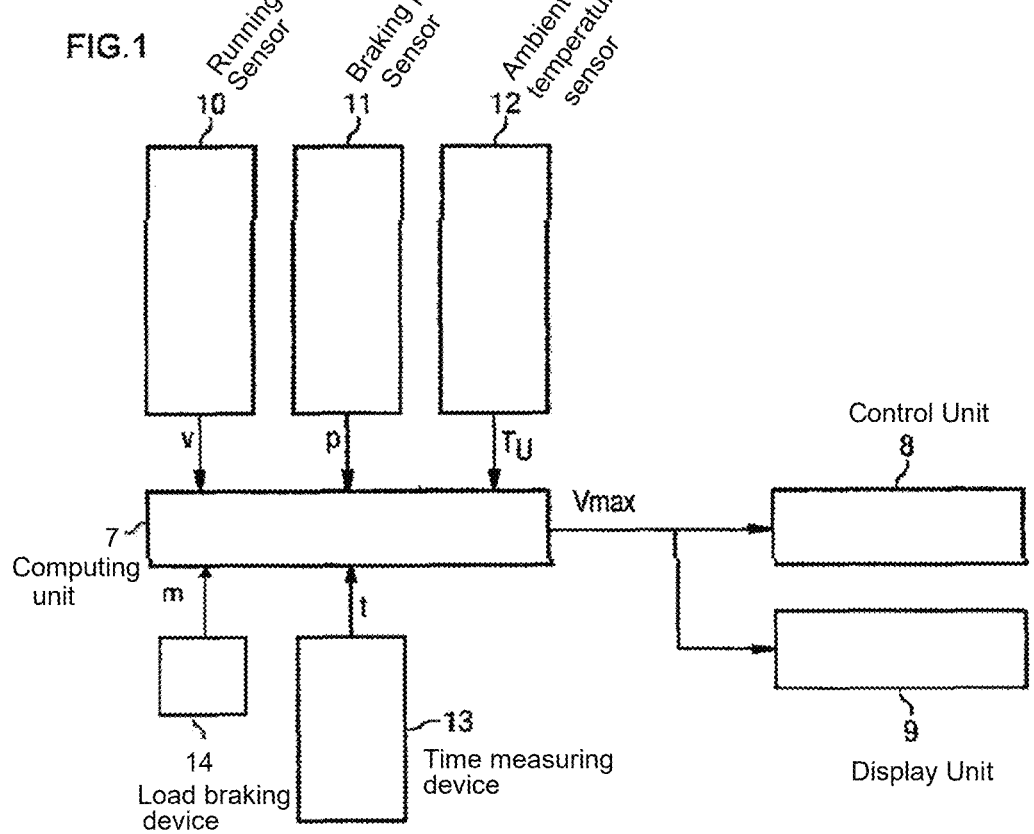
FIG. 2 shows a functional diagram of a device according to the disclosed embodiments given by way of example for performing the method according to the disclosed embodiments.

An example of a device for influencing the kinematic behavior of the rail vehicle has a computing unit 7 represented in FIG. 2, implemented in which is a model which carries out thermal calculations in accordance with the method according to the disclosed embodiments.

The device comprises a control unit 8 represented in FIG. 2, with which the kinematic behavior of the rail vehicle is influenced based on results of the thermal calculations.

Pressing of the first friction element 1 and the second friction element 2 against one another causes a braking effect on the rail vehicle. This involves a transformation of kinetic energy of the rail vehicle into heat, thereby causing a temperature increase of the first friction element 1 and the second friction element 2. A release of the first friction element 1 and the second friction element 2 from one another brings about a reduction or cessation of the braking effect on the rail vehicle. As a result of this and also as a result of an effect of known heat transfer principles, the temperatures in the first friction element 1 and in the second friction element 2 are reduced, i.e. the first friction element 1 and the second friction element 2 cool down. The described temperature behavior is calculated or estimated by means of the method according to the disclosed embodiments.

The device comprises a running speed sensor 10 for detecting a running speed v, a braking pressure sensor 11 for detecting a braking pressure p, and consequently a braking force FB, an ambient temperature sensor 12 for detecting an ambient temperature Tu, a time measuring device 13 for detecting an absolute time t and also a load braking device 14, which are connected by way of corresponding data lines to a computing unit 7, in order to make the sensor signals available to the model. The running speed sensor 10, the braking pressure sensor 11 and the ambient temperature sensor 12 are arranged in a chassis (not represented) of the rail vehicle. It is however also conceivable that the running speed v and also the braking pressure p are read into the computing unit 7 from a data bus system of the rail vehicle. Furthermore, it is also conceivable that the braking pressure p is approximately determined from a deceleration and a mass to be braked. The deceleration is in this case calculated for example by differentiation of the running speed v or is ascertained by way of acceleration sensors, and the mass m to be braked is determined by way of a load braking device 14. In addition, it is also conceivable that, instead of a running speed v, an angular speed of a wheel or a rotational wheel speed is detected and the thermal calculations are carried out with this angular speed or this rotational wheel speed. Furthermore, configuration data of the rail vehicle are stored in a memory (not represented here) of the computing unit 7 and are likewise available to the model. Also stored in the memory is an allowed friction element maximum temperature Tmax, for example of the first friction element 1.

Implemented in a control device (not represented), the time measuring device 13 and the computing unit 7 are arranged in a car body. The computing unit 7 receives by way of corresponding data lines from the running speed sensor 10 data with respect to the running speed v, from the braking pressure sensor 11 data with respect to the braking pressure p or the braking force FB, from the ambient temperature sensor 12 data with respect to the ambient temperature Tu, from the load braking device 14 data with respect to the vehicle mass m and from the time measuring device 13 data with respect to the absolute time t (timestamp) and performs computing operations in accordance with the method according to the disclosed embodiments. Furthermore, configuration data of the rail vehicle, also stored in the memory of the computing unit 7, are included in the computing operations of the model.

Figure 3A:
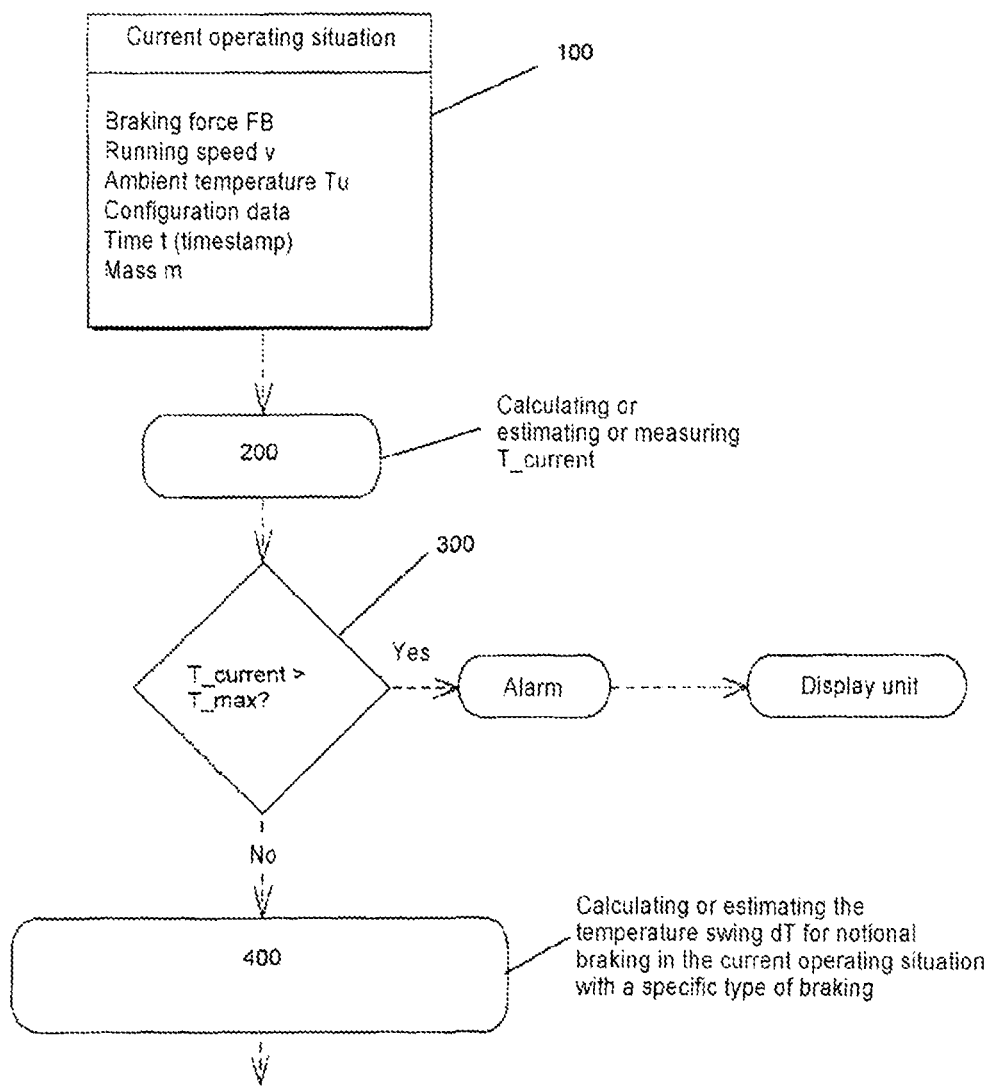
FIG. 3A/B shows a flow diagram of the method according to disclosed embodiments.
Figure 3B:
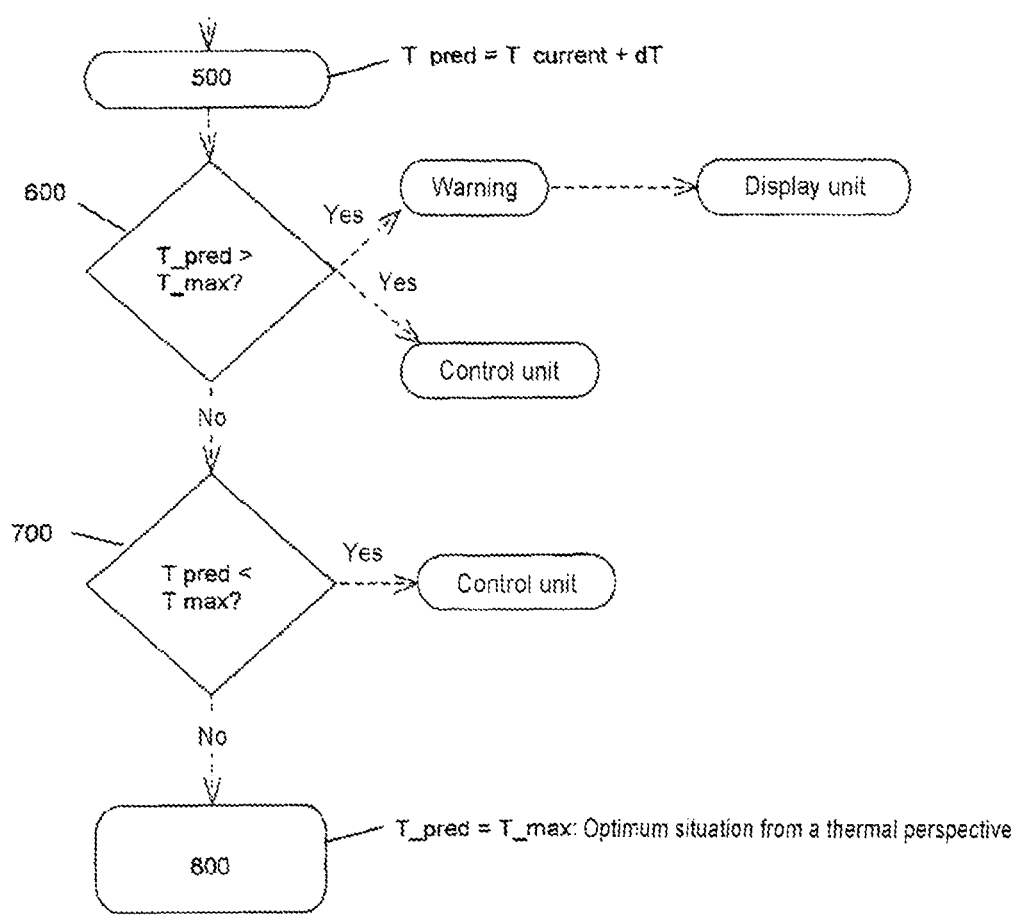

For example by using the running speed v, the braking force FB, the ambient temperature Tu, the absolute time t, the mass m and the configuration data of the rail vehicle, thermal states of the friction braking device represented in FIG. 1, in particular of its first friction element 1, are ascertained here according to the description in relation to FIGS. 3A and 3B.

The computing unit 7 is connected by way of corresponding data lines to a control unit 8, which is implemented in a vehicle controller (not represented) and is arranged in the car body. The control unit 8 influences the kinematic behavior of the rail vehicle in a way that, by signals generated based on a thermal calculation in the model implemented in the computing unit 7 and transmitted to the control unit 8, the rail vehicle for example maintains its current running speed v, is automatically braked or is accelerated. The braking may optionally take place by control of the traction, in order not to increase the brake disk temperature and the wear by an intervention of the friction brake. As a result, influencing of the thermal state of the friction braking device can be realized.

Furthermore, a display unit 9, connected to the computing unit 7 by way of a signal line, is arranged in a driver's cab (not shown) of the rail vehicle. Indications or warnings ascertained in accordance with the method according to the disclosed embodiments described further below based on thermal calculations are displayed on it to a driver of the traction vehicle. This allows monitoring of the thermal state of the friction braking device to be realized.

It is also possible that, with the display unit 9, speed restrictions, permissible decelerations or permissible running profiles (time sequences of acceleration and deceleration phases as well as phases at a constant running speed v or phases at a standstill) are additionally displayed by the display unit 9.

To warn of an unfavorable kinematic behavior of the rail vehicle with regard to thermal states of the friction braking system, acoustic signals can be additionally output to the driver of the traction vehicle by way of an audio output device of the display unit 9.

In this respect, various embodiments and arrangements of the running speed sensor 10, the braking force sensor 11, the ambient temperature sensor 12, the time measuring device 13, the display unit 9, the computing unit 7, the load braking device 14 and the control unit 8 are conceivable. It is for example conceivable, as shown in FIG. 2, to arrange the computing unit 7 and the control unit 8 separately, or else to integrate the computing unit 7 and the control unit 8 in one structural unit.

Furthermore, it is also conceivable that for example the computing unit 7 is arranged in a control center and communicates with the rail vehicle by way of radio signals, i.e. for example receives information about its running speed v and, based on a thermal calculation according to the disclosed embodiments that is carried out, sends instructions for restricting the running speed v.

FIGS. 3A and 3B show a flow diagram of a preferred embodiment of the method according to the disclosed embodiments for monitoring and influencing the thermal state dependent on a calculated or estimated predictive friction element temperature Tpred, for example of the first friction element 1 in the form of the brake disk of the disk brake.

As already described above, in an operation 100 parameters which characterize a current operating situation of the rail vehicle are detected. These include here for example the current running speed v, the current braking force FB, the current ambient temperature Tu, data with respect to the absolute time t (timestamp), the current mass m of the rail vehicle and also the configuration data of the rail vehicle.

In the model of the computing unit 7, a first temperature component Tcurrent of the predictive friction element temperature Tpred, for example of the first friction element 1, is then calculated or estimated for example based on the aforementioned current operating situation of the rail vehicle. Alternatively or else additionally, the first temperature component Tcurrent may also be measured directly by a temperature sensor. The first temperature component Tcurrent then corresponds for example to the surface temperature calculated or estimated by the model, which is obtained based on the actual current operating situation on the surface of the first friction element 1.

In a subsequent operation 300, it is then checked in the model whether the first temperature component Tcurrent is greater than the allowed friction element maximum temperature Tmax of the first friction element 1. If this is the case ("yes"), the calculating unit 7 generates for example an alarm signal or warning signal, which is then output, for example optically, on the display unit 9 and which represents or comprises for example an indication of a critical thermal state of the first friction element 1. Alternatively or additionally, an influencing signal could also be generated and output to the control unit 8, which controls the traction and/or the brake of the rail vehicle in an open-loop or closed-loop manner. By means of the influencing signal, then for example the running speed v and/or the deceleration a of the rail vehicle is reduced until the first temperature component Tcurrent is less than or equal to the allowed friction element maximum temperature Tmax of the first friction element 1.

If however this is not the case ("no"), in an operation 400 a second temperature component dT of the predictive friction element temperature Tpred is calculated or estimated by means of the model implemented in the computing unit 7. This second temperature component dT is referred to in FIG. 3A as the temperature swing dT and would be obtained in addition to the first temperature component Tcurrent on the surface of the first friction element 1 if, in the current operating situation of the rail vehicle, braking with a defined type of braking were notionally or theoretically carried out. This defined type of braking is for example not requested, or has not yet been requested, in the current operating situation, but could be requested in the current operating situation.

Figure 4:
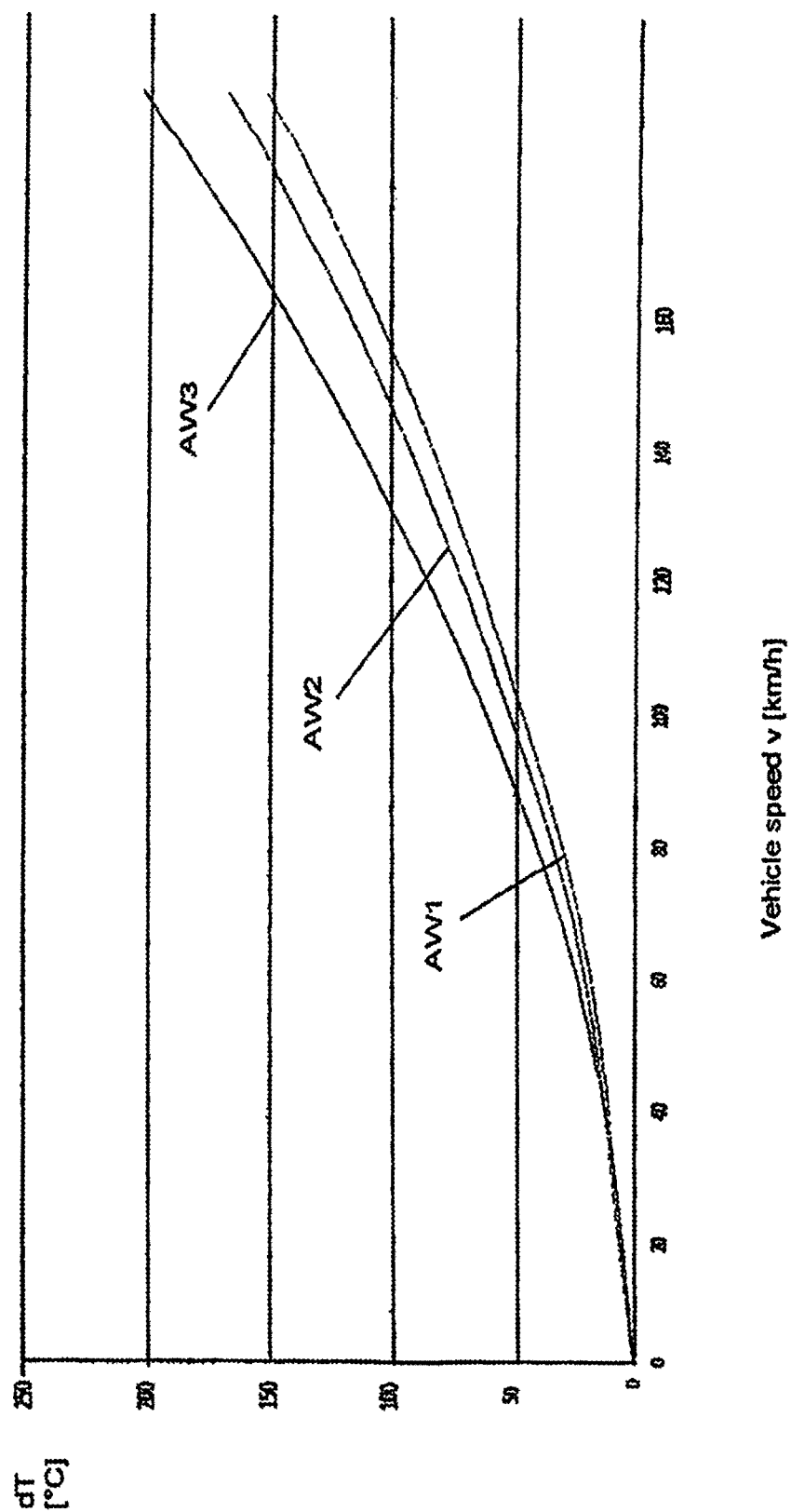
FIG. 4 shows a diagram in which the dependence of a second temperature component dT on the running speed v and loading state is represented.

The second temperature component dT of the predictive friction element temperature Tpred is in particular dependent on the running speed v occurring in the current operating situation at the point in time t (timestamp). FIG. 4 shows a diagram, which is for example stored in a characteristic map in the computing unit 7 and in which the dependence of the second temperature component dT on the running speed v is represented for various load cases, for example AW1: low loading, AW2: moderate loading and AW3: high loading. It goes without saying that other load cases may also be taken into consideration in the characteristic map. As can be seen, with increasing running speed v, which (also) characterizes the current operating situation, the second temperature component dT also increases. Consequently, by the diagram from FIG. 4 of the running speed v occurring in the current operating situation and the loading of the rail vehicle, a specific second temperature component dT of the predictive friction element temperature Tpred is assigned in the manner of a characteristic map.

Then, in an operation 500 the predictive friction element temperature Tpred is determined for example as the surface temperature of the first friction element 1 as the sum of the first temperature component Tcurrent and the second temperature component dT:

$$Tpred = Tcurrent + dT \quad (1)$$

Subsequently, in an operation 600 it is checked whether the predictive friction element temperature Tpred is greater than the allowed friction element maximum temperature Tmax of the first friction element 1. If this is the case ("yes"), the computing unit 7 generates here for example a warning signal, which is then optically output on the display unit 9 and which represents or comprises for example an indication of a critical thermal state of the first friction element 1.

Alternatively or additionally, an influencing signal could also be generated and then output to the control unit 8, which controls the traction and/or the brake of the rail vehicle in an open-loop or closed-loop manner. By means of the influencing signal, then for example the running speed v and/or the deceleration a of the rail vehicle is reduced until the predictive friction element temperature Tpred is for example equal to the allowed friction element maximum temperature Tmax of the first friction element 1. This represents a desirable ideal state, because then the "thermal loading potential" of the first friction element 1 is fully exhausted.

If however this is not the case ("no"), in an operation 700 it is checked whether the predictive friction element temperature Tpred is (already) less than the allowed friction element maximum temperature Tmax of the first friction element 1. If this is the case ("yes"), a possibly previously generated warning signal is reset or a warning signal is not generated. Just with regard to the thermal state of the first friction element 1, the speed v of the rail vehicle could however be increased. If therefore further conditions allow, such as for example the timetable or the traffic situation, the speed v could be increased until the predictive friction element temperature Tpred corresponds to the allowed friction element maximum temperature Tmax of the first friction element 1. For this reason, in the "yes" case the computing unit 7 generates for example an influencing signal and enters it into the control unit 8, in order that the latter controls the traction or the drive of the rail vehicle in an open-loop or closed-loop manner in order to increase the speed v correspondingly.

If however the inquiry in operation 700 finds that this is not the case ("no"), in operation 800 the ideal state described above, in which the predictive friction element temperature Tpred corresponds to the allowed friction element maximum temperature Tmax of the first friction element 1, occurs just in a thermal respect. In this case, therefore, no adaptation of the speed v is necessary.

It is clear that the method described above can also be applied for the second friction element 2 of the brake disk or additionally.

LIST OF DESIGNATIONS

1 First friction element
2 Second friction element
3 Linkage
4 Brake cylinder
5 Piston
6 Compressed-air connections
7 Computing unit
8 Control unit
9 Display unit
10 Running speed sensor
11 Braking pressure sensor
12 Ambient temperature sensor
13 Time measuring device
14 Load braking device
$T_{current}$ First temperature component
dT Second temperature component
$T_{pred}$ Predictive friction element temperature
$T_{max}$ Allowed friction element maximum temperature
v Vehicle speed
m Vehicle mass
FB Braking force
Tu Ambient temperature
t Time

The invention claimed is:

1. A method for monitoring and influencing the thermal state of a friction braking system of a rail vehicle based on a calculated or estimated predictive friction element temperature of at least one friction element of the friction braking system, the method comprising:
   detecting at least one parameter which characterizes a current operating situation of the rail vehicle;
   calculating, estimating or determining a first temperature component of the predictive friction element temperature based on the current operating situation of the rail vehicle;
   taking the first temperature component into consideration along with a second temperature component of the predictive friction element temperature when monitoring and influencing the thermal state of the friction braking system, wherein the second temperature component and the first temperature component at the at least one friction element are obtained on the assumption that, in the current operating situation of the rail vehicle, braking with a defined braking is notionally or theoretically carried out,
   wherein the predictive friction element temperature of the at least one friction element is determined as the sum of the first temperature component and the second temperature component, and
   only in response to the predictive friction element temperature being greater than the allowed friction element maximum temperature of the at least one friction element, a first signal is generated, representing a potentially thermally critical state of the at least one friction element.

2. The method of claim 1, wherein the defined braking comprises at least one of emergency braking, automatic train stopping, rapid braking, hazard braking.

3. The method of claim 1, wherein the first signal
   represents a warning signal, which is optically and/or acoustically output by way of an output unit and which represents or comprises an indication of the potentially thermally critical state of the at least one friction element, and/or
   represents a first influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is reduced until the predictive friction element temperature is less than or equal to the allowed friction element maximum temperature of the at least one friction element.

4. The method of claim 1, wherein, only in response to the predictive friction element temperature being less than the allowed friction element maximum temperature of the at least one friction element, a second signal is generated, which represent is a thermally uncritical state of the at least one friction element.

5. The method of claim 1, wherein the second signal represents an indicating signal, which is optically and/or acoustically output by way of an output unit and which comprises an indication to the effect that a current speed of the rail vehicle can be maintained or increased from a thermal perspective, and/or represents a second influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is increased until the predictive friction element temperature is equal to the allowed friction element maximum temperature of the at least one friction element.

6. The method of claim 1, wherein, in response to the first temperature component of the predictive friction element temperature alone being already greater than the allowed friction element maximum temperature of the at least one friction element, a third signal is generated, representing a thermally critical state of the at least one friction element.

7. The method of claim 6, wherein the third signal represents a warning signal, which is optically and/or acoustically output by way of an output unit and which represents or comprises an indication of the thermally critical state of the at least one friction element, and/or represents a third influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is reduced until the first temperature component is less than or equal to the allowed friction element maximum temperature of the at least one friction element.

8. The method of claim 1, wherein the parameter that characterizes the current operating situation is at least one of the following parameters: the current speed of the rail vehicle, the current braking force, the current braking torque, the current braking pressure, the ambient temperature of the rail vehicle, the current load and/or loading of the rail vehicle, an incline or a gradient of the section of track being run over by the rail vehicle, and service braking or normal application of the brakes.

9. The method of claim 1, wherein the friction element comprises a brake disk and/or a brake lining of a disk brake of the friction braking system, or a wheel running surface and/or a brake shoe of a shoe braking unit of the friction braking system.

10. A device for monitoring and influencing the thermal state of a friction braking system of a rail vehicle based on a predictive friction element temperature of at least one friction element of the friction braking system at least partially calculated or estimated by a model, the device comprising:
    detectors configured to detect at least one parameter which characterizes a current operating situation of the rail vehicle;
    a computing unit configured to monitor and influence the thermal state of the friction braking system and in which the model is implemented, wherein:
        the at least one detector enters the at least one parameter into the computing unit, and wherein the model calculates or estimates a first temperature component of the predictive friction element temperature based on the at least one parameter, or
        at least one detector is configured to detect the first temperature component of the predictive friction element temperature and enter it into the model, and wherein the computing unit takes the first temperature component into consideration when monitoring and influencing the thermal state of the friction braking system,
    wherein the model also takes into consideration a second temperature component of the predictive friction element temperature, which the model calculates or estimates in addition to the first temperature component at the at least one friction element on the assumption that, in the current operating situation of the rail vehicle, braking with a defined braking is notionally or theoretically carried out, and
    wherein the model also carries out calculations in such a way that the predictive friction element temperature of the at least one friction element is determined as the sum of the first temperature component and the second temperature component, and
    wherein the computing unit is configured to generate, based on the calculations of the model, a first signal representing a potentially thermally critical state of the at least one friction element only in response to establishment by the model that the predictive friction element temperature is greater than the allowed friction element maximum temperature of the at least one friction element.

11. The device of claim 10, wherein the defined braking comprises at least one of emergency braking, automatic train stopping, rapid braking, hazard braking.

12. The device of claim 10, wherein the first signal represents a warning signal, which is optically and/or acoustically output by way of an output unit and which represents or comprises an indication of the potentially thermally critical state of the at least one friction element, and/or
represents a first influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is reduced until the predictive friction element temperature is less than or equal to the allowed friction element maximum temperature of the at least one friction element.

13. The device of claim 10, wherein the computing unit is configured to generate a second signal representing a thermally uncritical state of the at least one friction element in response to establishing that the predictive friction element temperature is less than or equal to the allowed friction element maximum temperature of the at least one friction element.

14. The device of claim 10, wherein the second signal represents;
    an indicating signal, which is optically and/or acoustically output by way of an output unit and which comprises an indication to the effect that the speed of the rail vehicle can be maintained or increased from a thermal perspective, and/or
    a first influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is increased until the predictive friction element temperature is equal to the allowed friction element maximum temperature of the at least one friction element.

15. The device of claim 10, wherein the computing unit is configured to generate a third signal representing a thermally critical state of the at least one friction element only in response to establishment that the first temperature component of the predictive friction element temperature alone is already greater than the allowed friction element maximum temperature of the at least one friction element.

16. The device of claim 15, wherein the third signal represents:
    a warning signal, which is optically and/or acoustically output by way of an output unit and which represents or comprises an indication of the thermally critical state of the at least one friction element, and/or
    a third influencing signal, which is output to at least one controller of the rail vehicle, which controls the traction and/or the brake of the rail vehicle in an open-loop or closed-loop manner, and by which the running speed of the rail vehicle and/or the deceleration of the rail vehicle is reduced until the first temperature component is less than or equal to the allowed friction element maximum temperature of the at least one friction element.

17. The device of claim 10, wherein the parameter that characterizes the current operating situation is at least one of the following parameters: the current speed of the rail vehicle, the current braking force, the current braking torque, the current braking pressure, the ambient temperature of the rail vehicle, the current load and/or loading of the rail vehicle, an incline or a gradient of the section of track being run over by the rail vehicle, service braking or normal application of the brakes.

18. The device of claim 10, wherein the friction element comprises a brake disk and/or a brake lining of a disk brake of the friction braking system, or a wheel running surface and/or a brake shoe of a shoe braking unit of the friction braking system.

19. The device of claim 10, wherein the parameter that characterizes the current operating situation is at least one of the following parameters: the current speed of the rail vehicle, the current braking force, the current braking torque, the current braking pressure, the ambient temperature of the rail vehicle, the current load and/or loading of the rail vehicle, an incline or a gradient of the section of track being run over by the rail vehicle, service braking or normal application of the brakes.

20. The device of claim 10, wherein the rail vehicle comprises multiple friction brakes each with at least one friction element, wherein a temperature-dependent running behavior is respectively ascertained for each of the multiple friction brakes, and is consolidated over all the friction brakes on a train-wide level and the consolidated running instruction is passed on to the driver of the tractive unit or to a train control system.

21. A rail vehicle with a device as claimed in one of claim 10.

* * * * *